United States Patent [19]

Danico et al.

[11] Patent Number: 4,715,756
[45] Date of Patent: Dec. 29, 1987

[54] NUT AND WASHER ASSEMBLY

[75] Inventors: Henry F. Danico, Stoneham; Frederick A. Hammerle, Topsfield, both of Mass.

[73] Assignee: TRW Inc., Cleveland, Ohio

[21] Appl. No.: 917,231

[22] Filed: Oct. 6, 1986

Related U.S. Application Data

[63] Continuation of Ser. No. 635,978, Jul. 30, 1984.

[51] Int. Cl.[4] .................. F16B 33/00; F16B 37/08
[52] U.S. Cl. .................. 411/369; 411/432; 411/542; 411/908
[58] Field of Search .......... 411/369, 368, 1, 2, 411/3, 8, 9, 10, 11, 427, 533, 538, 542, 544, 907, 908, 432, 302, 303, 371

[56] References Cited

U.S. PATENT DOCUMENTS

| | | | |
|---|---|---|---|
| 1,457,749 | 6/1923 | Rast | 411/10 |
| 1,961,470 | 6/1934 | Winchester et al. | |
| 2,761,349 | 9/1956 | Heller | 411/432 |
| 2,851,079 | 9/1958 | Heller | |
| 2,981,651 | 4/1961 | Arnold | 411/542 X |
| 3,087,371 | 4/1963 | Orner | |
| 3,191,730 | 6/1965 | Fischer | 411/542 X |
| 3,425,473 | 2/1969 | Knowlton | |
| 3,659,491 | 5/1972 | Duffy et al. | |

FOREIGN PATENT DOCUMENTS

| | | | |
|---|---|---|---|
| 707974 | 4/1965 | Canada | 411/542 |
| 1934799 | 1/1970 | Fed. Rep. of Germany | |
| 2619559 | 11/1977 | Fed. Rep. of Germany | 411/3 |
| 2359313 | 7/1977 | France | |
| 867013 | 5/1961 | United Kingdom | |
| 929807 | 6/1963 | United Kingdom | |
| 1046456 | 10/1966 | United Kingdom | 411/542 |

Primary Examiner—Neill Wilson
Attorney, Agent, or Firm—Fay, Sharpe, Beall, Fagan, Minnich & McKee

[57] ABSTRACT

A fastener assembly of the nut and washer type includes a washer member having a skirt portion and an end portion to which a nut member is secured. A collar section connects the skirt portion to the end portion. The collar section is designed to fracture at a predetermined torque load such that the nut and the end portion of the washer secured thereto will rotate with respect to the skirt portion.

8 Claims, 5 Drawing Figures

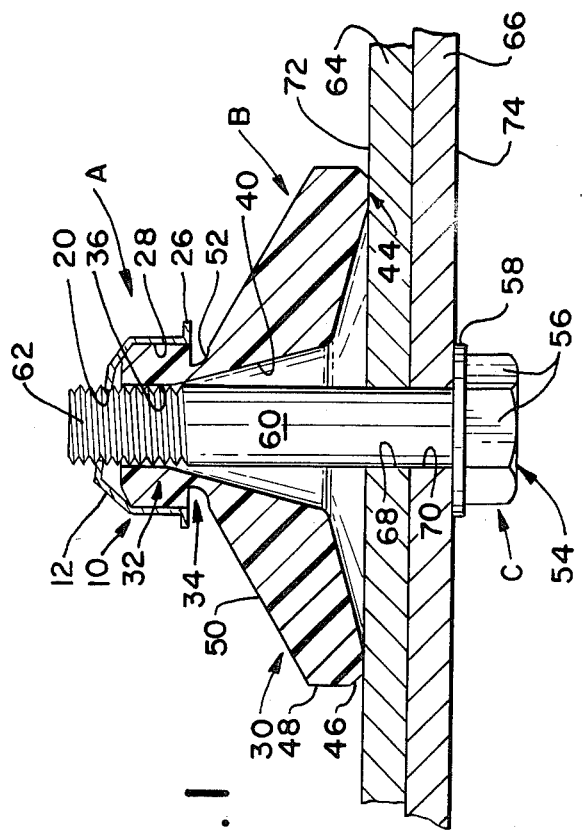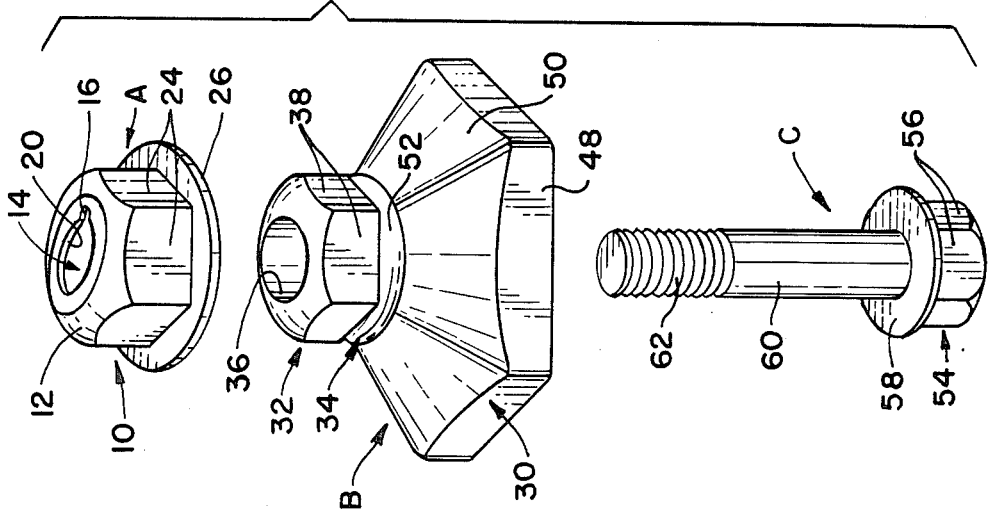

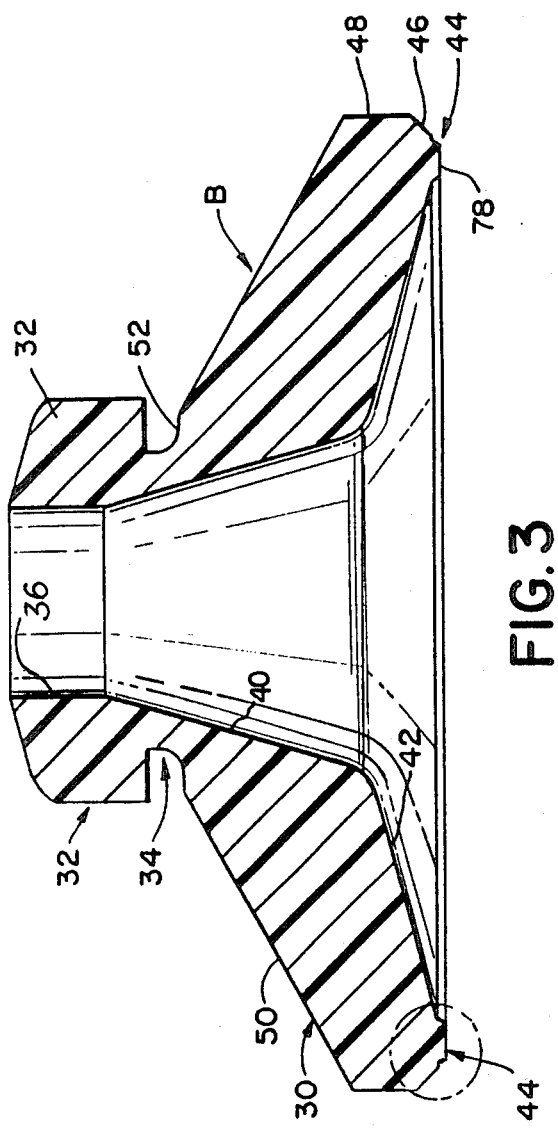
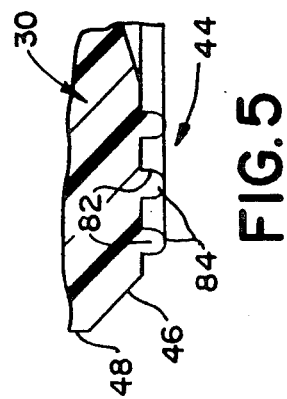

NUT AND WASHER ASSEMBLY

This application is a continuation of application Ser. No. 635,978, filed 7-30-84.

BACKGROUND OF THE INVENTION

This invention generally pertains to fastener assemblies. More specifically, the present invention relates to a washer member having a nut secured thereto adjacent a selectively frangible area thereof.

The invention is particularly applicable to nut and wash assemblies which are utilized in fastening automobile body panels together. For this type of application, it is required that the assemble be able to bear up under high torque values while retaining a sealing function and not adversely affecting the quality of the joint. However, it will be appreciated by those skilled in the art that the invention has broader application and may also be adapted to use in many other fastening environments where it is necessary to fasten any two members to each other.

Several free spinning nut and washer assemblies are known to the art. One conventional assembly includes a sheet metal nut in the form of a cup having a tranverse wall provided with an opening. The edge portions of the opening are formed into thread form to cooperate with a threaded fastener. This nut is combined with a washer having a tubular portion received within the cup, and the combined nut and washer is provided with a yieldable sealing material normally extending therebeyond for direct engagement with an article on which the nut is to be used. The sealing element is comprised of plastic material or rubber, and completely fills the cavity within the tubular portion of the washer and the nut except for an axially extending opening aligned with the threaded fastener receiving opening of the nut. Such a conventional nut and washer assembly is expensive to produce and necessitates use of a sealing element which is separate from the washer. Moreover, under a torque load on the nut, the sealing element is forced upwardly around the fastener, thus acting as a lubricant and reducing torque values.

Another conventional nut and washer assembly includes a dome-shaped sheet metal washer and a metal nut joined to the washer by a frangible bonding element. After the nut and washer assembly is threaded onto a fastener, the nut is broken away from the washer for allowing the nut to compensate for other than a perpendicular relationship between the surface on which the washer rests and the fastener. This washer does not, however, serve a sealing function.

It has been considered desirable to provide an inexpensive nut and washer assembly in which the nut could be secured to a portion of the washer but would rotate independent of the washer to which it is secured, after a predetermined torque load has been reached. It has also been considered desirable to have a nut and washer assembly which would eliminate the separate sealing element while still providing an effective seal.

The subject invention meets the foregoing needs and others to provide a new and improved nut and washer assembly that yields better and more advantageous overall operational results.

BRIEF SUMMARY OF THE INVENTION

In accordance with the present invention, a new and improved fastener assembly includes a washer member and a fastener receiving member. More particularly, the washer member includes a skirt portion, a reduced diameter end portion, and a frangible collar section intermediate the skirt portion and the end portion. The fastener receiving member is associated with the washer end portion. The collar section is weakened and fractures at a predetermined torque load to enable the fastener receiving member to rotate with respect to the skirt portion.

In accordance with another aspect of the invention, the fastener receiving member comprises a separate nut member. This nut member has a cup-shaped body adapted to closely receive the washer end portion, and means for engaging an elongated fastener. The engaging means may comprise, for example, means for threadedly engaging a threaded fastener, or other arrangements for fixedly engaging a fastener shank.

In accordance with another aspect of the invention, the washer member is generally conically shaped and is constructed of a plastic material. The nut, in turn, is constructed of metal.

According to a still further aspect of the invention, the skirt portion of the washer is provided with a sealing face at the outer terminal end thereof. Such face may be in the form of a sealing band or a plurality of sealing ridges which seal against an associated workpiece surface. These sealing ridges may have rounded or pointed apex areas.

In accordance with still another aspect of the invention, the washer skirt portion has a generally frusto-conical configuration.

The principal advantage of the present invention is the provision of a new and improved fastener assembly comprised of a washer member and fastener receiving member wherein the washer member has a frangible collar section which fractures at a predetermined torque load for enabling the fastener receiving member to rotate relative to the washer member.

Another advantage of the invention resides in the provision of such a fastener assembly which does not require a separate sealing element to provide effective sealing.

A further advantage of the invention is the provision of a nut and washer type fastener assembly which is simple and inexpensive to manufacture while being extremely effective in practical application.

Yet another advantage of the invention is the provision of a fastener assembly having a plastic washer member which will not skive or abrade the surface on which it rests during washer rotation.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 1 is an exploded perspective view of a fastener assembly formed in accordance with the present invention;

FIG. 2 is a cross-section of the fastener assembly as used for securing two plates to each other;

FIG. 3 is an enlarged cross-sectional view of the washer member formed in accordance with the invention and showing two alternative arrangements for the washer sealing face;

FIG. 4 is a greatly enlarged cross-sectional view of the circled portion of the washer member of FIG. 3 but showing an alternative form of washer sealing face; and, FIG. 5 is a view similar to FIG. 4 showing another alternative embodiment of the washer member sealing face.

DETAILED DESCRIPTON OF THE PREFERRED AND ALTERNATE EMBODIMENTS

Referring now to the drawings, wherein the showings are for purposes of illustrating preferred and alternate embodiments of the invention only and not for purposes of limiting same, FIG. 1 shows the subject new fastener assembly as including a nut A and a washer member B. A threaded or other fastener C which is retainingly received by nut A is also shown. While the fastener assembly is primarily designed for and will hereinafter be described in connection with the fastening together of automotive body panels, it will be appreciated that the overall inventive concept involved could be adapted to use in numerous other environments.

Nut A includes a nut body 10 which has a generally cup or top hat-type shape. In the preferred arrangement here under discussion, the nut body comprises a sheet metal stamping. However, other materials and/or methods of manufacture could also be employed satisfactorily. A somewhat conical top portion 12 includes a central fastener receiving opening 14 having a radial slot 16 communicating therewith. This slot acts to define a generally arcuate edge portion 20, and this edge portion is formed into a helical configuration. Edge portion 20 is helicoidally shaped to permit entry of one end of the edge portion into the threaded portion of fastener C (FIG. 2). The edge portion may advantageously be beveled so as to facilitate ease of engagement with the threads of a conventional threaded fastener.

It will be evident to those skilled in the art that the arcuate edge portion 20 of the nut can be formed in other manners without in any way departing from the overall intent or scope of the invention. Moreover, nut A may itself take other forms or styles while facilitating successful practice of the inventive concept involved.

Nut body 10 also has a plurality of sidewalls 24 which are formed into a noncircular cross-section to accept engagement by a conventional wrench or other turning tool (not shown). In the illustrated embodiment of the invention, the sides of the nut body 10 define a hexagon. It will be appreciated, however, that other conventional types of polygonal conformations such as squares and the like also may suitably be employed. The nut body is further provided with a flange or skirt 26 which extends radially outward from and peripherally around the bottom of the sidewalls 24. As mentioned, nut body 10 is cup-shaped and includes a generally hexagonal interior cavity 28 corresponding to the exterior conformation. However, other cavity conformations may also be utilized without departing from the invention.

The fastener assembly of the present invention also includes a washer member B comprised of a skirt portion 30, a smaller or reduced diameter end portion 32, and a narrow collar section 34 which connects portions 30, 32. Preferably, the washer member is molded or otherwise formed of a plastic material. Any plastic having good sealing and appropriate strength characteristics would be acceptable, and in some cases, other materials could also be used. A central aperture 36 extends axially through end portion 32, and the end portion has a conformation which closely corresponds with cavity 28 of nut body 10. In this way, the nut can be received on and secured to washer end portion 32 by means of a press fit relationship or the like. By way of one alternative construction, it would be possible to incorporate threads in central aperture 36 so that end portion 32 would function as a nut. In that case nut body 10 could be eliminated.

With particular reference nwo to FIG. 2, a first axially extending aperture 40 extends through the skirt portion 30 and collar section 34 in communication with aperture 36. Preferably, aperture 40 increases in diameter in a direction away from the reduced diameter portion 32, and communicates with a second tapered aperture 42 adjacent the lower end of the skirt portion. the tapered nature of apertures 40, 42 permits the washer to experience flexure in response to relative advancement between fastener C and nut A will be described. As a result, the washer will exert a continuous biasing force against the nut as well as seal against an associated workpiece. A sealing surface 44 is provided on a lower periphery of the skirt portion to effect sealing against an associated workpiece surface. As shown in the drawings, sealing surface 44 is disposed in a plane which is generally normal to the longitudinal axis of washer B. However, it is not necessary that this relationship be maintained, and other angular relationships may be experienced and accommodated at installation. The skirt portion also includes first and second peripheral sidewalls 46, 48, as well as a top wall 50. An inwardly curved surface portion 52 is provided intermediate skirt top wall 50 and collar section 34.

A conventional threaded fastener C, eg., a bolt or stud, can extend through the aligned apertures in washer B and nut A. Fastener C includes a head 54 provided with a polygonal conformation defined by a plurality of planar sidewalls 56 engageable by a conventional driving tool (not shown). The fastener also has an enlarged flange 58 adjacent head 54 and an elongated shank 60 extending outwardly therefrom. Shank 60 is threaded over a portion thereof as at 62 to receive a nut. It will be appreciated that other types of fastener arrangements may also be suitably employed including, for example, constructions where the shank portion is fixedly secured to or integral with a workpiece.

Continuing with reference to FIG. 2, fastener C is shown as being used in combination with the subject new washer and nut assembly for securing two workpieces 64, 66 to each other. When the fastener passes through aligned apertures 68, 70 in the two workpieces and is threaded into the aperture 14 of nut A, the washer B is drawn toward contact with the outer surface 72 of workpiece 64. At the same time, flange 58 of the fastener C comes toward contact with the outer surface 74 of workpiece 66. In this manner, the two workpieces may be drawn toward each other to assume a close fitting relationship. At the same time skirt portion 30 may be flexed somewhat under the influence of nut A to enhance sealing between sealing surface 44 and workpiece surface 72. Since the skirt portion is constructed from plastic, such flexure will also cause a continuous force to be placed against the nut tending to prevent unloosening of the fastener.

A wrench or other appropriate tool may then be used on fstener head 54 to advance threaded portion 62 further into nut A. Frictional contact between workpiece surface 72 and the lower periphery of skirt portion 30 functions to prevent rotation of the washer and nut, thus permitting advancement of the fastener into the nut as the fastener is rotated.

As previously noted, collar section 34 of the washer is weakened, ie., is frangible, so that it will fracture when a predetermined torque load is applied to nut A. As a result, when a predetermined torque level is reached during fastener tightening, nut A, along with end portion 32 received in cavity 28, will separate from the remainder of the washer structure at collar section 34. Upon separation, the nut will turn or rotate with respect to washer skirt portion 30 as the nut or fastener is rotated further.

The point where collar section 34 allows separation between the nut A with washer reduced diameter portion 32 and skirt portion 30 may advantageously be set to occur within some predetermined torque range so that the skirt portion is disposed in a desired cooperative relationship with workpiece surface 72. At the time of separation at the collar section, sealing surface 44 of the skirt portion is disposed in sealing contact with workpiece surface 72. Because of the pliable nature of collar section 34, skirt portion 30, hence sealing surface 44, may be flexed somewhat relative to the longitudinal axis of the washer to sealingly accommodate angled surfaces. Washer end portion 32 remains inside nut cavity 28 to create a torquing member and to also serve as an effective seal around threaded portion 62 of fastener C. This relationship prevents moisture from getting into aperture 40 and penetrating through aligned apertures 68, 70 in workpieces 64, 66.

With reference now to FIG. 3, it will be appreciated that sealing surface 44 may advantageously be constructed to take a number of different forms. For example, a plurality of outwardly extending sealing ridges 76 as shown in FIG. 4 can be provided to define the sealing surface with three such ridges being illustrated. Alternatively, the sealing surface can take the form of a band 78 as shown in FIG. 3. Of course, the sealing surface normally would not be provided with both types of sealing arrangements at the same time.

With reference again to FIG. 4, if sealing ridges 76 are provided, they could have pointed apexes 80. Because the washer is preferably made of a plastic material, there will be no tendency for sealing surface 44 to lacerate the surface finish on workpiece surface 72. This is useful in the event workpiece 64 comprises a vehicle body panel or the like since it prevents the possibility of scratches and resultant corrosion of the metal from which the body panel member is made.

FIG. 5 shows another alternative embodiment for the sealing surface. In the FIGURE, a plurality of sealing ridges 82 on the skirt portion are each provided with rounded apexes 84. It will be evident to those skilled in the art that still other alternative configurations may satisfactorily be employed for the sealing surface.

The subject invention advantageously provides a device which is useful in various applications, especially automotive assembly applications requiring nut and washer assemblies which are able to sustain predetermined torque and load values while also having a moisture proof sealing element. In a test of several samples of the present invention, torque values as high as 100 inch pounds have been obtained before fracture or separation occurred between the nut and the washer skirt. Of course, the torque value which causes separation may be varied by modifying the characteristics of the collar section which interconnects the washer end and skirt portions. In contrast with the washer and nut assemblies of the prior art, the present assembly is considerably less expensive due to the elimination of a mastic sealing material as a separate component. The provision of a plastic washer for automotive use is also considered to be more advantageous since it is non-corroding and there is no tendency for the washer to lacerate the surface finish of an associated workpiece or panel.

The invention has been described with reference to preferred and alternate embodiments, obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A fastener assembly comprising:
   a washer member molded from plastic and including a skirt portion having a sealing face and a reduced diameter end portion integrally joined to said skirt portion by a collar section interposed between said skirt and end portions, a fastener receiving aperture for receiving the threaded shank of an elongated threaded fastener, said aperture extending generally centrally through said skirt portion, said end portion and said collar portion, at least the portion of said aperture associated with said skirt portion being devoid of threads;
   a generally cup-shaped metal nut means having an internal open configuration generally corresponding to said end portion positioned over and enclosing said end portion and press fitted thereto for driving rotation therewith, said nut means having side walls terminating above said skirt portion and further including a threaded opening aligned with said aperture and adapted to threadedly receive the shank of an elongated threaded fastener extending through said aperture; and,
   said collar section having a width substantially less than said end portion and a conformation to facilitate fracture thereof when a predetermined torque load is applied between said skirt portion and end portion for allowing said skirt portion and end portions to be rotated relative to each other.

2. The fastener assembly of claim 1 wherein said fastener receiving aperture increases in cross-sectional dimension axially therealong from adjacent said collar section to adjacent said sealing face, said fastener receiving aperture providing said washer with a greater capacity for undergoing compression in an installed condition.

3. The fastener assembly of claim 1 wherein the sealing face on said washer member skirt portion is disposed at the terminal end of said washer spaced remote from said end portion.

4. The fastener assembly of claim 3 wherein the sealing face is defined by a narrow band extending around said washer terminal end.

5. The fastener assembly of claim 4 wherein said sealing face is defined by a plurality of concentric sealing ridges extending around said washer terminal end.

6. The fastener assembly of claim 5 wherein said sealing ridges terminate in outermost apex areas.

7. The fastener assembly of claim 6 wherein said apex areas are generally rounded in cross-section.

8. The fastener of claim 1 wherein said skirt portion has a generally frusto-conical conformation increasing in cross-section from adjacent said collar section to a washer terminal end which includes said sealing face.